US011630200B2

(12) United States Patent
Jiang et al.

(10) Patent No.: US 11,630,200 B2
(45) Date of Patent: Apr. 18, 2023

(54) PASSIVE LOCATION MEASUREMENT

(71) Applicant: INTEL CORPORATION, Santa Clara, CA (US)

(72) Inventors: Feng Jiang, Santa Clara, CA (US); Qinghua Li, San Ramon, CA (US); Jonathan Segev, Tel Mond (IL); Xiaogang Chen, Portland, OR (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/739,994

(22) Filed: May 9, 2022

(65) Prior Publication Data

US 2022/0390589 A1    Dec. 8, 2022

Related U.S. Application Data

(63) Continuation of application No. 16/262,369, filed on Jan. 30, 2019, now Pat. No. 11,366,219.

(60) Provisional application No. 62/629,215, filed on Feb. 12, 2018, provisional application No. 62/623,965, filed on Jan. 30, 2018.

(51) Int. Cl.
| | |
|---|---|
| *G01S 5/14* | (2006.01) |
| *G01S 13/87* | (2006.01) |
| *H04W 24/10* | (2009.01) |
| *H04W 64/00* | (2009.01) |
| *H04L 9/08* | (2006.01) |
| *G01S 5/02* | (2010.01) |
| *H04W 84/12* | (2009.01) |

(52) U.S. Cl.
CPC .......... *G01S 13/876* (2013.01); *G01S 5/0226* (2013.01); *G01S 5/14* (2013.01); *H04L 9/0861* (2013.01); *H04W 24/10* (2013.01); *H04W 64/00* (2013.01); *H04L 2209/80* (2013.01); *H04W 84/12* (2013.01)

(58) Field of Classification Search
CPC ........ G01S 13/876; G01S 5/0225; G01S 5/14; H04L 9/0861; H04W 24/10
USPC ........................................................ 342/453
See application file for complete search history.

(56) References Cited

U.S. PATENT DOCUMENTS

2017/0026929 A1*  1/2017  Grischy ............... H04W 24/10

FOREIGN PATENT DOCUMENTS

WO    WO-2017220635 A1 * 12/2017  ............... H04L 1/08

* cited by examiner

*Primary Examiner* — Harry K Liu
(74) *Attorney, Agent, or Firm* — Eversheds Sutherland (US) LLP

(57) ABSTRACT

This disclosure describes systems, methods, and devices related to passive location measurement in wireless communications. A device may perform a ranging measurement with a first device and a second device. The device may identify a first uplink (UL) location measurement report (LMR) received from the first device. The device may identify a second UL LMR received from the second device. The device may cause to send a first broadcast LMR comprising information associated with the ranging determination of the first device and the second device. The device may cause to send a second broadcast LMR comprising the measurement information carried in the first UL LMR and the second UL LMR.

20 Claims, 16 Drawing Sheets

PASSIVE LOCATION MEASUREMENT

CROSS-REFERENCE TO RELATED APPLICATION(S)

This application is a continuation of U.S. application Ser. No. 16/262,369, filed Jan. 30, 2019, which claims the benefit of U.S. Provisional Application No. 62/623,965, filed Jan. 30, 2018, and U.S. Provisional Application No. 62/629,215, filed Feb. 12, 2018, all disclosures of which are incorporated herein by reference as if set forth in full.

TECHNICAL FIELD

This disclosure generally relates to systems, methods, and devices for wireless communications and, more particularly, passive location measurement.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
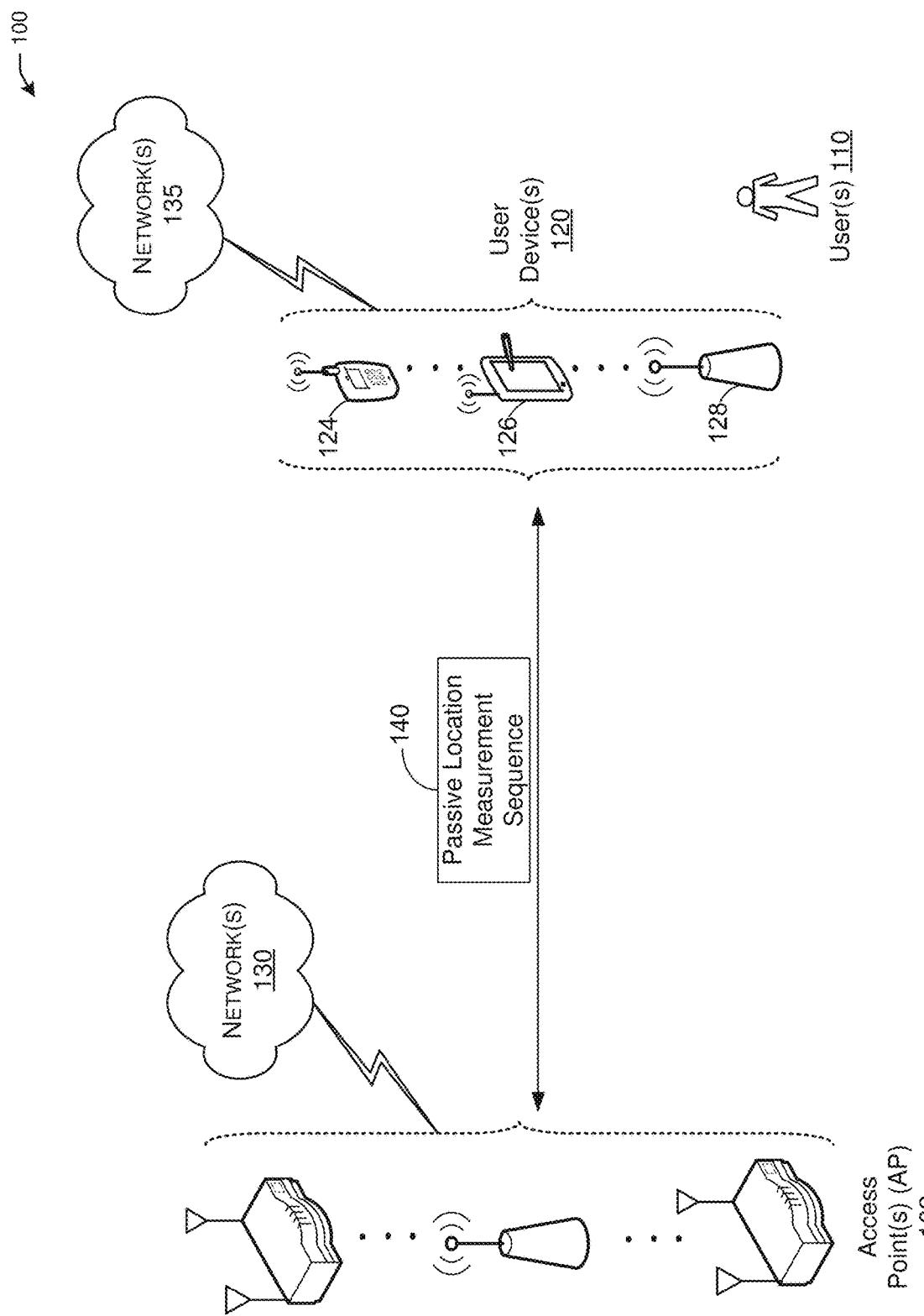
FIG. 1 depicts a diagram illustrating an example network environment of an illustrative passive location measurement system, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

In the development of 802.11az, it is expected to design a passive location mode, which could potentially support an unlimited number of passive clients to implement positioning simultaneously. It has been proposed to reuse the trigger-based multi-user (MU) measurement sequence in 802.11az for passive location, and this proposal requires an access point (AP) STA acting as a fine timing measurement (FTM) responding STA (RSTA), and at least two STAs acting as an FTM initiating STA (ISTA) to exchange the trigger-based MU measurement sequence and the passive client can listen to the packet exchanges between RSTA and ISTAs. Based on the RSTA and ISTA's location and the time of arrival (ToA) and time of departure (ToD) of the null data packet (NDP) frames transmitted by RSTA and ISTA, the passive client can derive its own location. In other words, in a passive location mode, while the RSTA and the ISTA perform active ranging between themselves, the passive client could listen to the message exchanges between the RSTA and the ISTA. The passive client would also need to know the locations of the RSTA and the ISTA. Based on this information, the passive client can derive its own location.

The advantage of this approach is it can achieve high medium efficiency, but in this proposal, the security issue related to the passive location has not been addressed. Also, the efficiency of the MU sequence could be further improved.

In the trigger-based MU measurement sequence for active location, the downlink (DL) LMR is carried in a high efficiency (HE) multi-user physical layer protocol data unit (MU-PPDU), but in the above proposal's sequence, the DL LMR should be a broadcast packet, and this requires the hardware/software change at the RSTA and ISTA. Additionally, the above proposal does not address the security protection issue in the passive location, and the efficiency of the MU sequence for passive location can be further improved.

Example embodiments of the present disclosure relate to systems, methods, and devices for passive location measurement with security protection.

In one embodiment, a passive location measurement system may address the security issue in the MU measurement sequence for passive location and may facilitate a low complexity method for passive location based on MU measurement sequence in 802.11az.

In one or more embodiments, a passive location ranging mode may be a variant of the trigger based (TB) ranging mode that consists of ranging exchanges between a responding STA (RSTA) and a set of initiating station devices (ISTAs). An RSTA may be a master AP and an ISTA may be a slave AP (referred to an anchor station).

In one or more embodiments, a passive location measurement system may send one more broadcast messages that may be received by passive client devices in proximity of a master access point (AP) after the master AP performs a cycle of ranging message exchange with slave APs. The one or more broadcast messages may contain information that may assist a passive client device in determining its own location based on knowing the master AP's and slave AP's location and on receiving one or more messages associated with the ranging message exchange.

In one or more embodiments, a passive location measurement based on non-trigger-based SU measurement sequence may address the security issue in the MU sequence for passive location. Further, the passive location based on the SU measurement sequence has lower implementation complexity.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment, in accordance with one or more example embodiments of the present disclosure. Wireless network 100 may include one or more user devices 120 and one or more access point(s) (AP) 102, which may communicate in accordance with IEEE 802.11 communication standards. The user device(s) 120 may be mobile devices that are non-stationary (e.g., not having fixed locations) or may be stationary devices.

Figure 6:
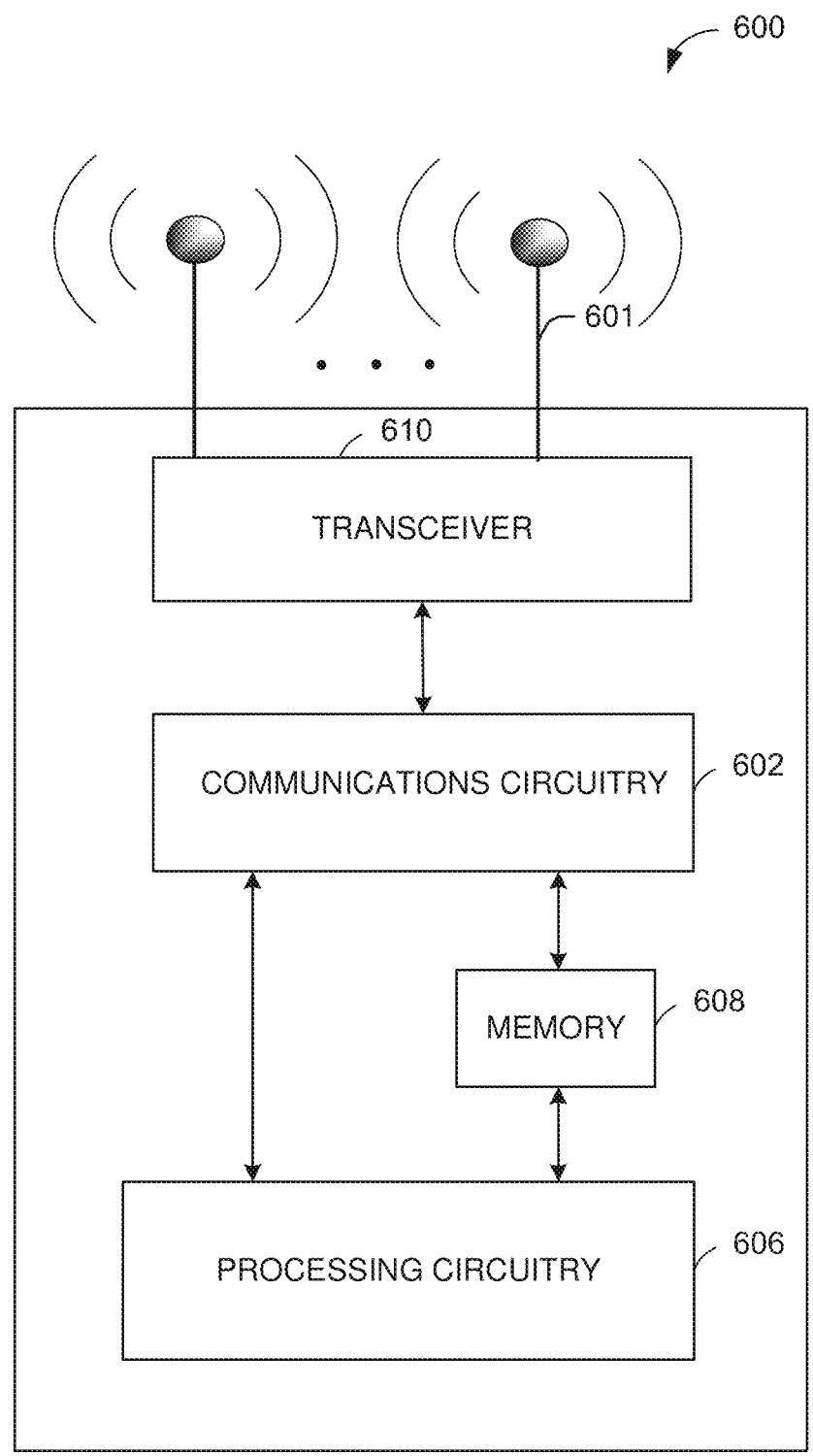
FIG. 6 depicts a functional diagram of an example communication station, in accordance with one or more example embodiments of the present disclosure.
Figure 7:
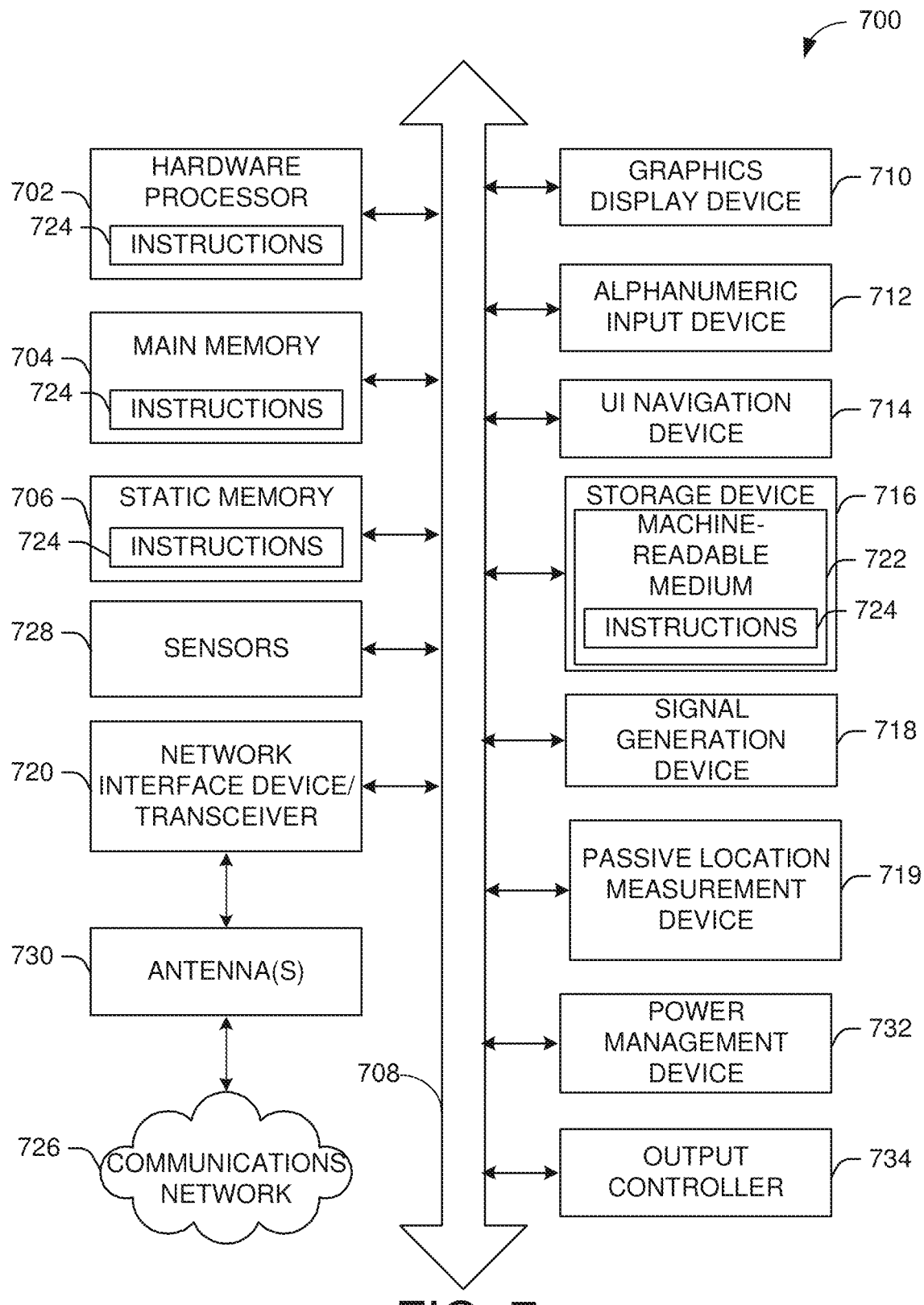
FIG. 7 depicts a block diagram of an example machine upon which any of one or more techniques (e.g., methods) may be performed, in accordance with one or more example embodiments of the present disclosure.

In some embodiments, the user devices 120, and the AP(s) 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

Some embodiments may be used in conjunction with devices and/or networks operating in accordance with existing standards. Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc. WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102.

For example, one or more APs 102 may perform passive location measurement 140 with one or more user devices 120. It is understood that the above descriptions are for purposes of illustration and are not meant to be limiting.

Figure 2A:
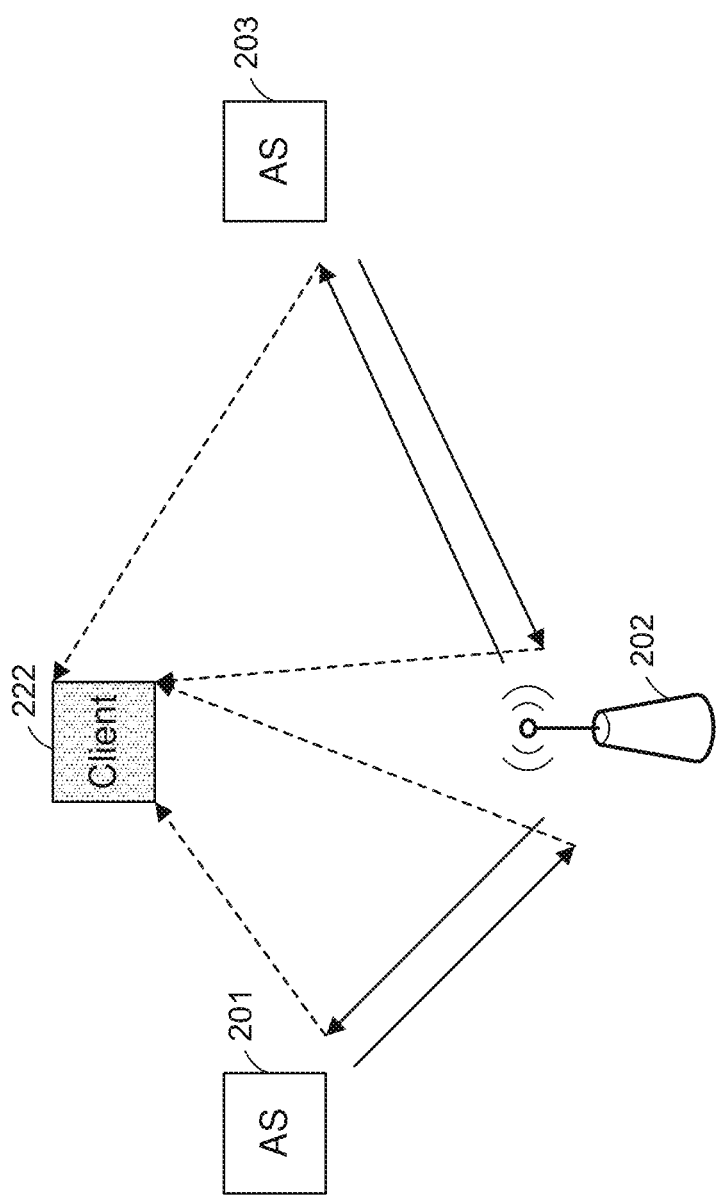
FIGS. 2A-2C depict illustrative schematic diagrams for trigger-based multi-user (MU) measurement sequence for passive location, in accordance with one or more example embodiments of the present disclosure.
Figure 2B:
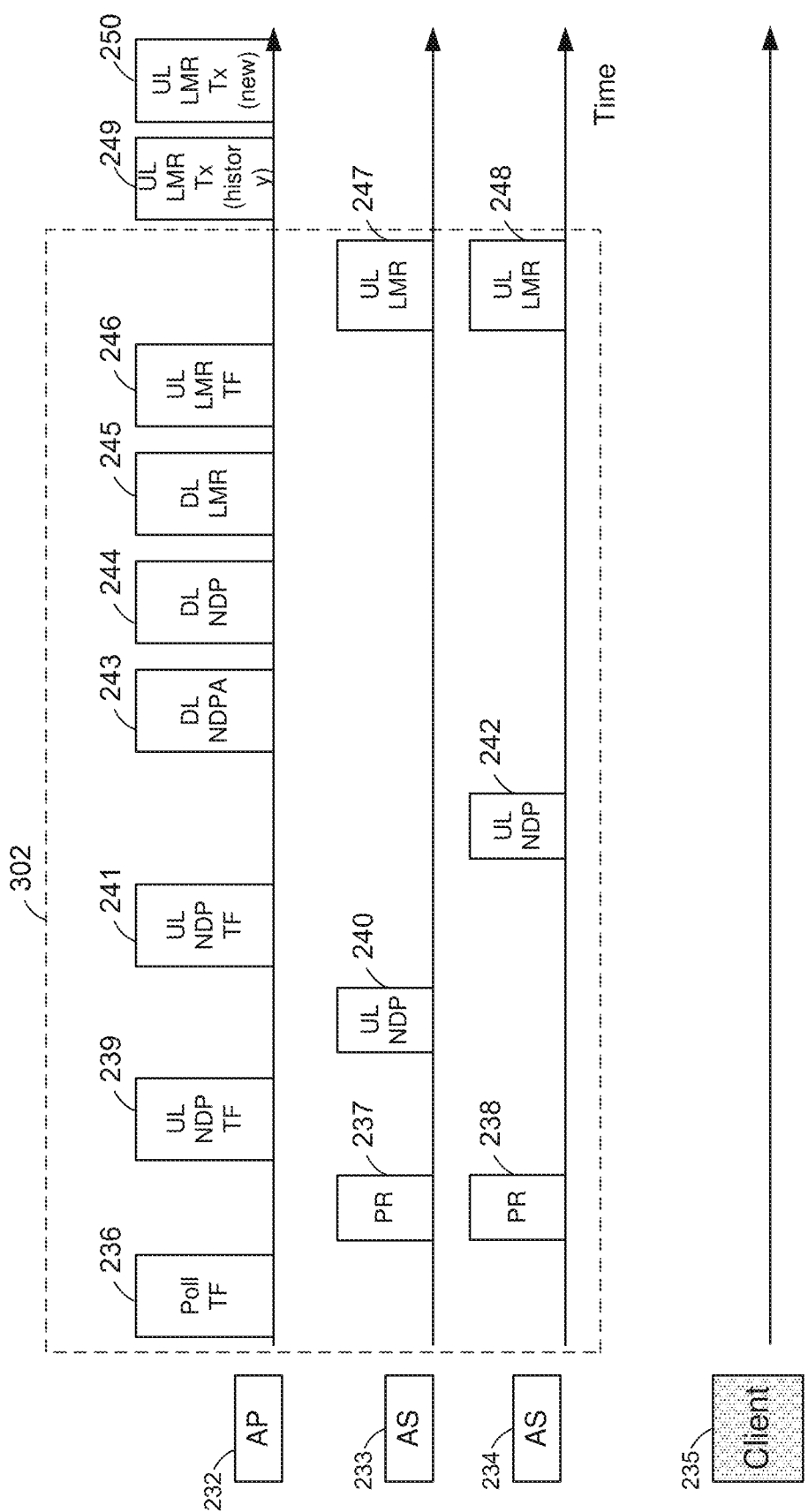
Figure 2C:
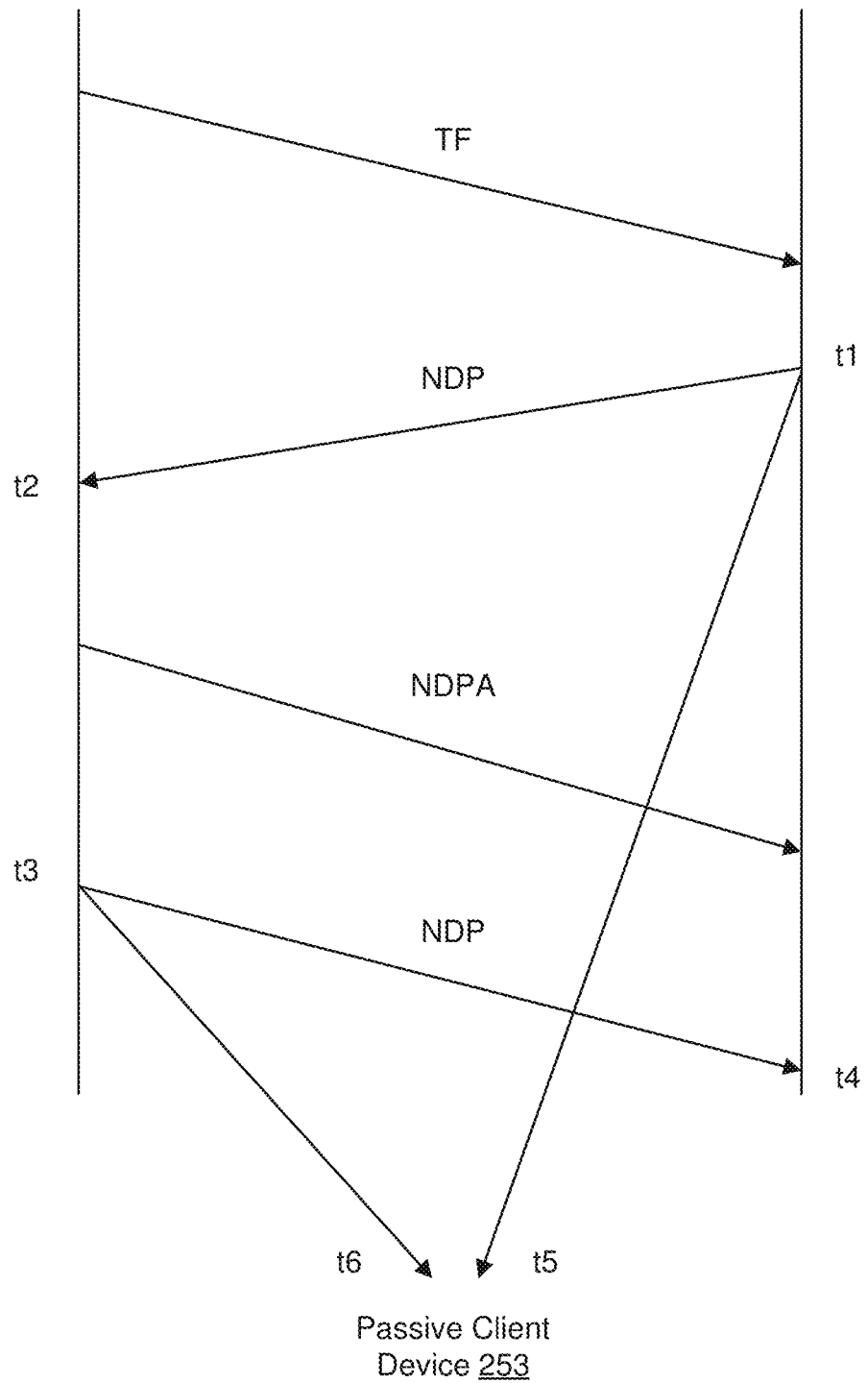

FIGS. 2A-2C depict illustrative schematic diagrams for trigger-based MU measurement sequence for passive location, in accordance with one or more example embodiments of the present disclosure.

Referring to FIG. 2A, there is shown a master AP 202 performing ranging determination with an anchor station 201 and an anchor station 203. There is also shown a client device acting as a passive client interested in determining its own location based on the ranging determination performed between the master AP 202, the anchor station 201, and the anchor station 203. In all the following plots shown in figures, the interval between two frames is short inter-frame space (SIFS).

As shown in FIG. 2A, The passive client 222 listens to the measurement sequence exchange between master AP (AP 202) and the anchor station 201 and anchor station 203 (which could be a slave AP). Based on the locations of the master AP (AP 202) and the slave APs (anchor station 201 and anchor station 203) and the ToA and ToD of the NDP frames sent by the master AP and the slave APs, the passive client 222 can derive its location information.

FIG. 2B describes the MU measurement sequence exchange between the master AP and slave APs.

Referring to FIG. 2B, there is shown frame exchanges during ranging determination between a master AP 232, an anchor station 233 and an anchor station 234. Further, there is shown a client device 235 that acts as a passive client device capable of capturing and decoding some of the frames exchanged between the master AP 232, the anchor station 233, and the anchor station 234. FIG. 2B shows a ranging measurement phase 302 that depicts a cycle of MU ranging measurement determination between the devices. The ranging measurement phase 302 starts with the master AP 232 sending a poll trigger frame 236 to anchor station 233 and anchor station 234.

The anchor station 233 may respond with a poll response 237 and the anchor station 234 may respond with poll response 238. The master AP 232 may then send trigger frames to trigger a UL NDP from each anchor station (e.g., UL NDP TF 239 and UL NDP TF 241). The anchor stations may then respond with their UL NDPs (e.g., UL NDP 240 and UL NDP 242). The master AP 232 may then send DL NDPA 243 to the anchor stations. After a SIFS time, the master AP 232 may send a DL NDP 244 followed by a DL LMR 245 then a UL LMR trigger frame 246. The UL LMR trigger frame solicits respective UL LMRs (e.g., UL LMR 247 and UL LMR 248) from the respective anchor stations.

In FIG. 2B, the master AP 232 may send DL LMR message carried in a HE MU-PPDU to anchor stations 233 and 234. However, these messages may not be received and decoded by the client 235.

Referring to FIG. 2C, there is shown timing measurements showing various timing information captured between a master AP 250, and anchor station 251 and a passive client device 253. For example, after the master AP 250 sends the trigger frame, the anchor station 251 may send the NDP frame at time t1, which is received by the master AP 250 at time t2. Then after the master AP 250 sends the NDPA to the anchor station 251, the master AP 250 sends an NDP at time t3, which is received by the anchor station 251 at time t4. As shown in FIG. 2C, the passive client device 253 may also capture the NDP sent from the anchor station 251 to the master AP 250 and the NDP sent from the master AP 250 to the anchor station 251. In addition, the passive client device 253 may determine time t5 at which it received the first NDP and time t6 at which it received the second NDP. Based on this information, the passive client device 253 may build a hyperbolic equation for its location. The passive client can derive its location based on two or more of these hyperbolic equations FIG. 3 depicts an illustrative schematic diagram for passive location measurement, in accordance with one or more example embodiments of the present disclosure.

Figure 3:
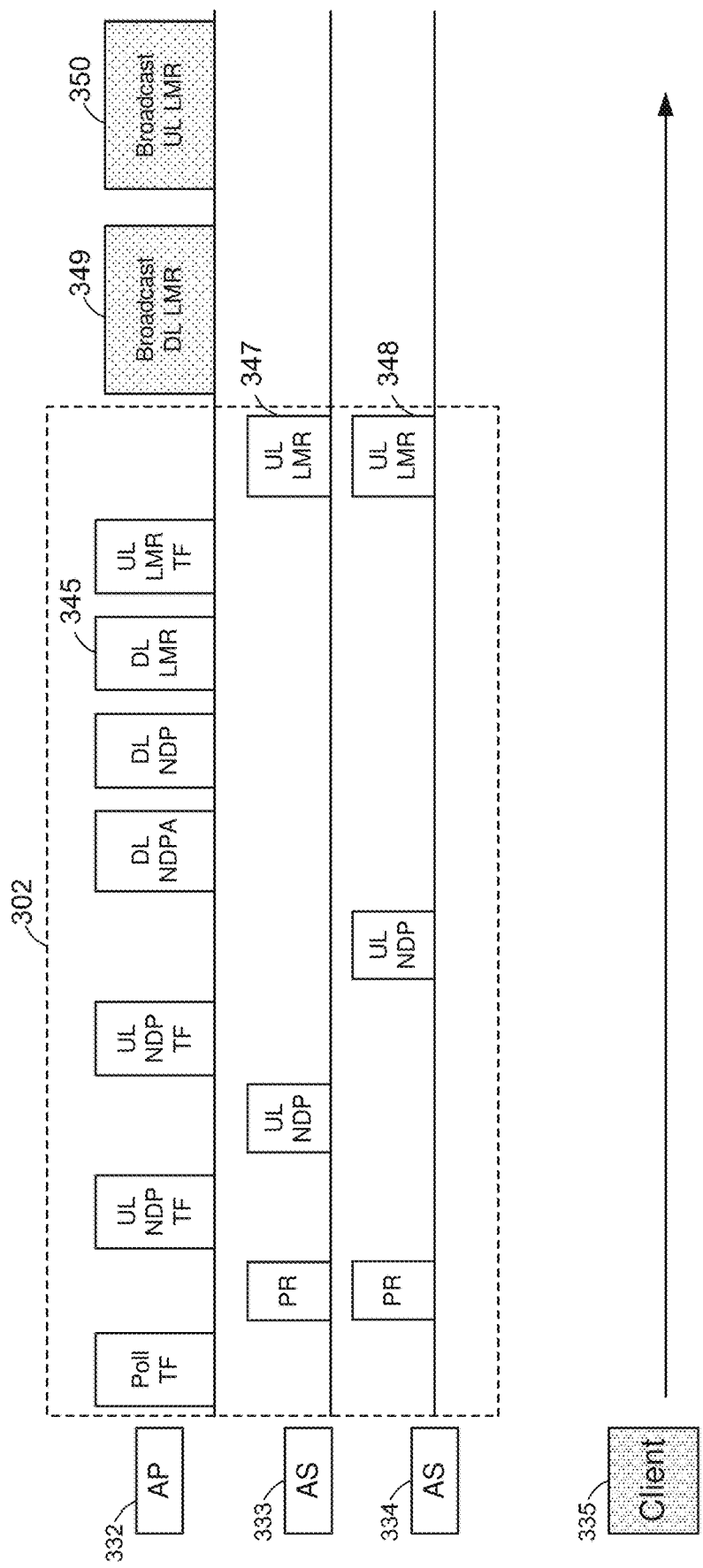
FIG. 3 depict illustrative schematic diagram for passive location measurement based on the trigger-based MU measurement sequence, in accordance with one or more example embodiments of the present disclosure.

Referring to FIG. 3, there is shown one more frame exchanges during ranging determination between a master AP 332 (e.g., RSTA), an anchor station 333 and an anchor station 334 (e.g., ISTA). Further, there is shown a client device 335 that acts as a passive client device capable of capturing and decoding some of the frames exchanged between the master AP 332, the anchor station 333, and the anchor station 334.

In one or more embodiments, the RSTA (e.g., master AP 332) may send two broadcast passive location measurement report frames (e.g., broadcast DL LMR 349 and broadcast UL LMR 350) a SIFS time after receiving the LMR frames (e.g., UL LMR 347 and UL LMR 348) received from anchor stations 333 and 334.

In this sequence, it is assumed that the DL LMR 345 is carried in HE MU PPDU, which is the same as the trigger-based MU sequence for active location. Also, for security purpose, it is assumed that DL LMR 345 and UL LMR frames 347 and 348 are protected management frames (PMFs), for example, encrypted by pairwise security key, and the broadcast DL LMR 349 and broadcast UL LMR 350 frames are protected by a group encryption key, and this key could be the group temporal key (GTK) defined in 802.11i for broadcast packet protection. The negotiation between the master AP 332, slave AP (e.g., anchor station 333 and/or anchor station 334) and passive clients (e.g., client 335) should also be protected by the pairwise key encryption or group key encryption. To use the pairwise key or the group key, the master AP 332, slave AP (e.g., anchor station 333 and/or anchor station 334) and passive client 335 need to first establish the keys, using a protocol similar to the 4-way handshakes in the authentication. The master AP 332 needs first to decode the UL LMR (e.g., UL LMR 347 and/or UL LMR 348) from slave AP (e.g., anchor station 333 and/or anchor station 334) and prepare the broadcast UL LMR 350 which includes the information in the UL LMR (e.g., UL LMR 347 and/or UL LMR 348). The reason that the master AP 332 sends the broadcast DL LMR 349 and broadcast UL LMR 350 separately is the master AP 332 can have more time for preparing the broadcast UL LMR 350 frame. If the master AP 332 can processing the broadcast UL LMR fast, the broadcast DL LMR 349 and broadcast UL LMR 350 can be aggregated into a single broadcast packet. In all the following plots shown in figures, the interval between two frames is SIFS.

The broadcast DL LMR frame 349 could include the following information for the passive client:

(1) The long training field (LTF) sequence information used for the UL and DL NDP for the current round or previous round or following round measurement sequence, and this information could be Sequence Authentication Code (SAC) information or raw LTF sequence information. This LTF information will be used by the passive client to derive the LTF sequence and implement channel estimation for corresponding UL NDP and DL NDP.

(2) The ToA and ToD information of the UL NDP and DL NDP sent by the slave APs and master AP in the current round or previous round trigger-based MU measurement sequence, for example, t2 and t3 as shown in FIG. 2C. This ToA/ToD information is identified by the master AP and slave AP's AID or ranging AID and the sounding dialog token corresponding to the measurement sequence. These timestamp information will be used by the passive client to build the equation for passive location.

(3) The master AP and slave AP's location information.

(4) A sounding dialog token for identifying the LMR frame.

The broadcast UL LMR 350 frame could include the following information for the passive client:

(1) The LTF sequence information used for the UL and DL NDP for the current round of measurement sequence or a previous round of measurement sequence or a following round of measurement sequence and this information could be SAC code information or raw LTF sequence information. This LTF information will be used by the passive client to derive the LTF sequence and implement channel estimation for corresponding UL NDP and DL NDP.

(2) The ToA and ToD information of the UL NDP and DL NDP sent by the slave APs and master AP in the current round or previous round trigger-based MU measurement sequence, for example, t1 and t4 as shown in FIG. 2C. This ToA/ToD information is identified by the master AP and slave AP's AID or ranging AID and the sounding dialog token corresponding to the measurement sequence. These timestamp information may be used by the passive client to build the equation for passive location.

(3) The master AP and slave AP's location information.

(4) A sounding dialog token for identifying the LMR frame.

The DL LMR 345 frame could include the following information for the slave AP:

(1) The SAC code for generating the LTF sequence in UL and DL NDPs for the following round measurement.

(2) The ToA and ToD information of the UL NDP and DL NDP for the current round or previous round measurement sequence, for example, t2 and t3 as shown in FIG. 2C (3) A sounding dialog token for identifying the LMR frame.

The UL LMR (e.g., UL LMR frames 347 and 348) could include the following information for the slave AP:

(1) The ToA and ToD information of the UL NDP and DL NDP for the current round or previous round measurement sequence, for example, t1 and t4 as shown in FIG. 2C (2) A sounding dialog token for identifying the LMR frame.

The slave AP and the associated passive client can get the pairwise encryption key and group encryption key in the associated process with the master AP. For the unassociated STA, the pre-association security negotiation is developed in 11az, and in this mode, the unassociated STA can derive the protection key (pairwise key or group key) with AP using the public keys.

In FIG. 2C, the master AP 250, and slave AP 251 may use the same group security key to encrypt the DL LMR, UL LMR, broadcast DL LMR and broadcast UL LMR. It should be noted that the sequence in FIG. 2C can also be used for the non-security mode, and for this case, there is no encryption for DL LMR, UL LMR, broadcast DL LMR and broadcast UL LMR, and the LTF code for UL NDP and DL NDP may be known in advance to the passive clients.

It should be noted that in for the encryption of the LMR frames mentioned above the symmetric key is assumed between the master AP and the passive client. Another possible solution is to use the non-symmetric keys, similar to the random seed announcement (RSA) public key cryptography. For example, the master AP shares the public key to the passive client and the master AP and slave AP uses a private key to encrypt the LMR packets and the passive client can use the public key to decrypt the LMR packets. Assume there exists a invalid passive client (e.g., an attacker), since the passive clients does not know the private key, this bad client cannot generate a MAC level attack to the LMR frames.

For the security and medium efficiency consideration, a system may define an MU sequence for passive location. In this sequence, it is assumed the DL LMR and UL LMR are protected management frame (PMF), which is similar to the active location security mode. The SAC code for generating the long training field (LTF) sequence in UL and DL NDPs are exchanged between master AP and slave AP in the PMF protected LMR of last round measurement sequence.

In one or more embodiments, as explained in FIG. 3, the DL LMR is used by the master AP to share the LMR with the slave AP, and for passive location, the slave AP may not need to know the master AP's LMR. To further increase the security level for the DL NDP, instead of sharing the SAC code of the LTF sequence of DL NDP in the LMR of the previous round measurement sequence, the SAC code for LTF sequence of the DL NDP can be included in the DL LMR of the current round measurement sequence.

If the attacker wants to attack the passive location sequence shown in FIG. 3, the only chance for the attacker is to send a fake broadcast LMR packet, and this fake broadcast LMR packet can include wrong information for LTF sequence information, or ToA/ToD information or the master AP's or slave AP's location information. To avoid such an attack, the following two methods may be proposed:

(1) Slave AP also listens to the broadcast LMR packets from the master AP. If the slave AP finds that the information included in the broadcast LMR packet does not match with the information that it reports to the master AP, then the slave AP can send out a broadcast LMR packet including an alert information, and also this slave AP should include an alert information in the UL LMR of the following round measurement sequence. When the master AP receives such alert information in the broadcast LMR or UL LMR, it should include alert information in the DL LMR for all the slave AP, and all the slave AP and master AP should send broadcast LMR including the alert information. When the passive client receives the broadcast LMR with alert information, the passive location should be disabled.

(2) After the passive client receives the broadcast LMR, it can periodically check with the master AP or some other server whether the information included in the broadcast LMR is the same as what the master AP intends to send. If there is a mismatch between the information in passive client's received LMR and the information in the master AP's intended LMR, then the master AP should issue an alert in the broadcast LMR packet.

Figure 4A:
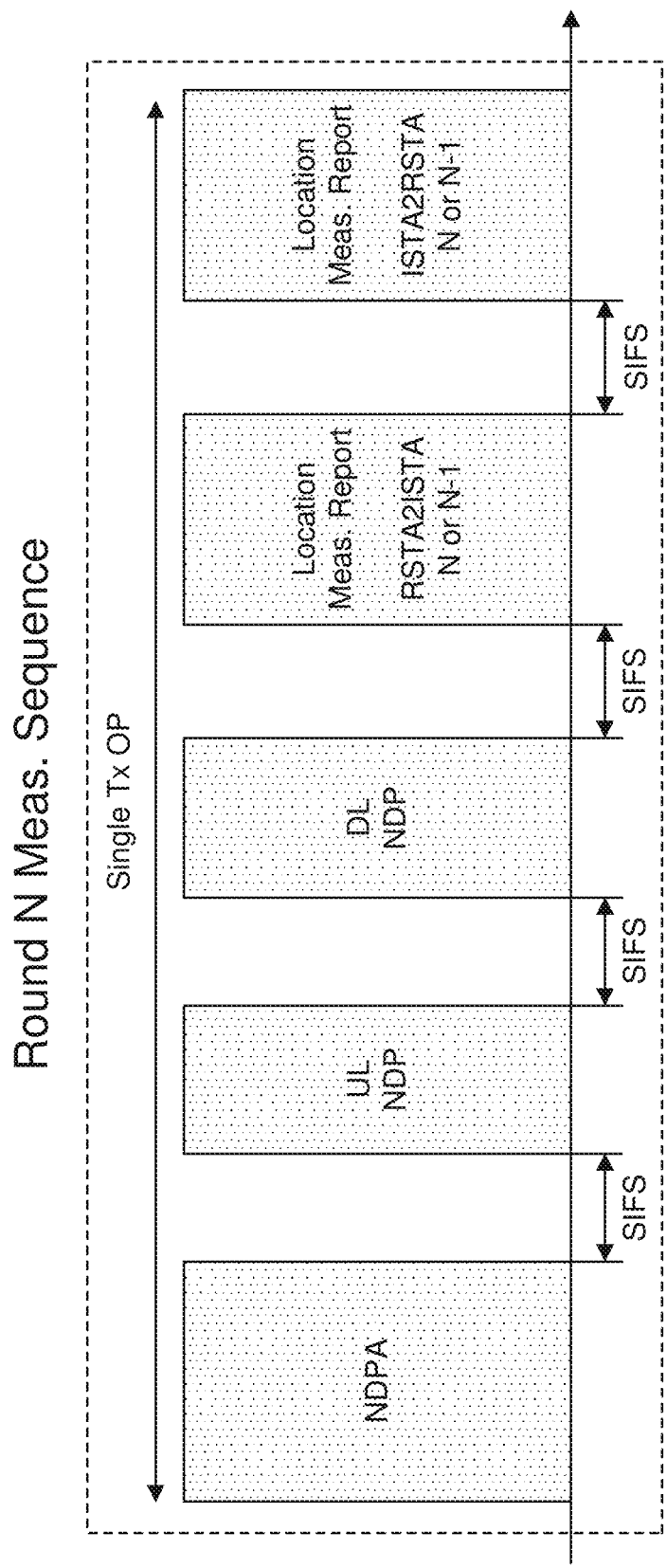
FIGS. 4A-4D depict illustrative schematic diagrams for passive location measurement based on non-trigger-based single user (SU) measurement sequence, in accordance with one or more example embodiments of the present disclosure.

In one embodiment, to simplify the implementation complexity of the passive location, a passive location method may be designed based on the non-trigger-based SU measurement sequence as shown in FIG. 4A.

Figure 4B:
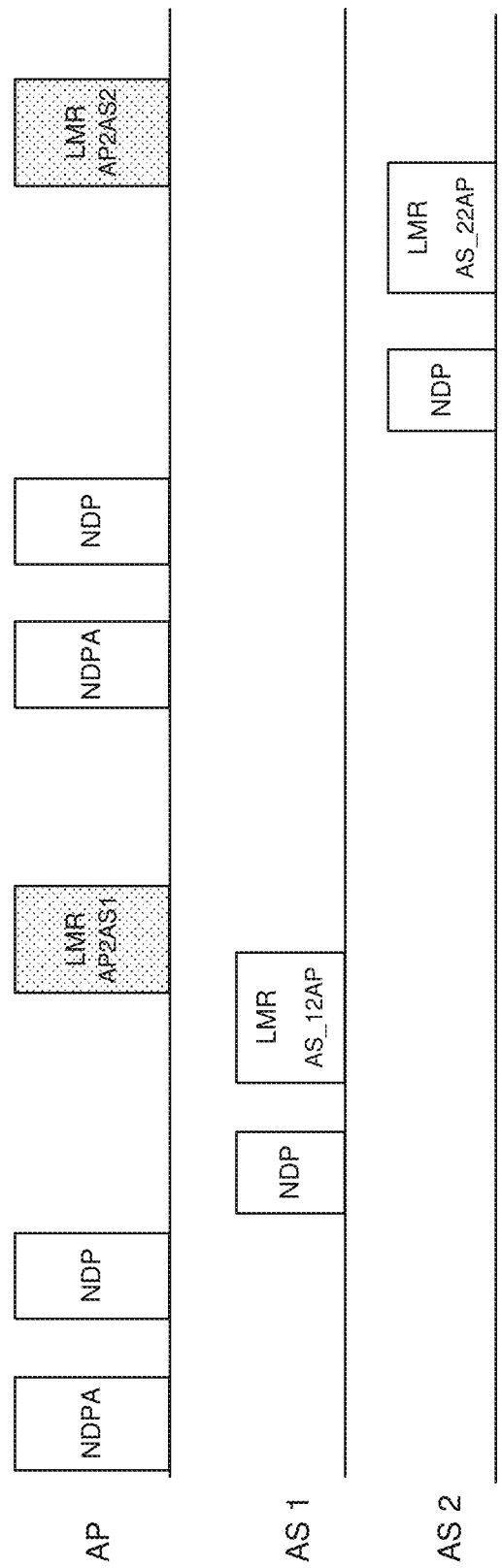
Figure 4C:
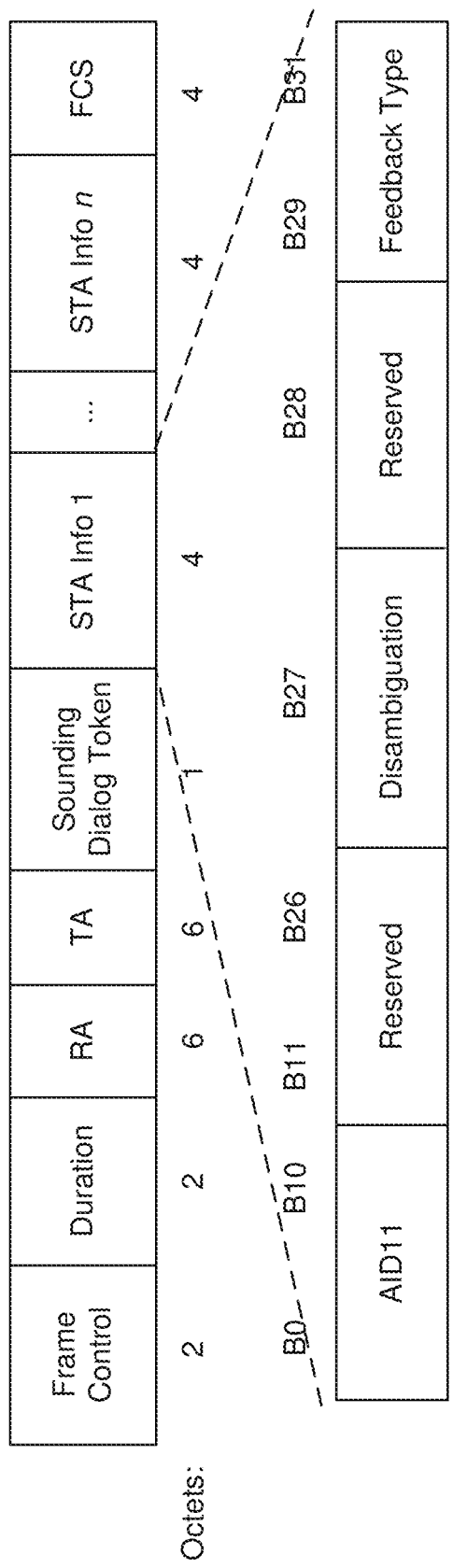
Figure 4D:
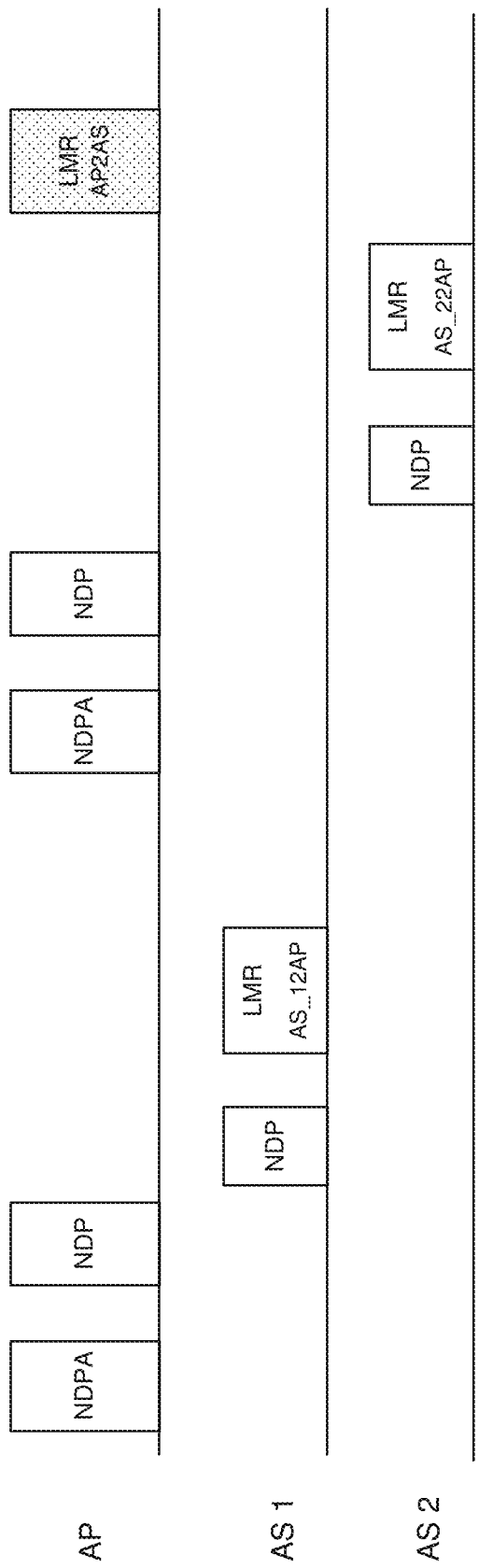

FIGS. 4B and 4D depict illustrative schematic diagrams for passive location based on non-trigger-based SU measurement sequence, in accordance with one or more example embodiments of the present disclosure.

The master AP can initialize the SU measurement sequence with different slave APs, and the passive client can listen to the packet exchanges between the master AP and slave AP. If the passive client has listened to the packet exchanges between master AP and two or more different slave APs, then theoretically based on the ToA/ToD information of the UL NDP and DL NDP, and the location information of master AP and slave APs, the passive client can derive its own location information.

The AS_12AP LMR or AS_22AP LMR corresponds to the RSTA2ISTA LMR in FIG. 4A and the AP2AS1 LMR or AP2AS2 LMR corresponds to the ISTA2RSTA LMR in FIG. 4A. Compared with the existing sequence in FIG. 4A, the only difference needed in FIG. 4B is the AP2AS1 LMR and AP2AS2 LMR is a broadcast packet, and in this broadcast LMR packet, the following information should be included:

(1) the ToA/ToD information of the NDP from master AP and slave Aps.

(2) the master AP's and slave AP's location information.

(3) the LTF sequence information used for the master AP's and slave AP's NDP.

(4) also, a new type of null data packet announcement (NDPA) may be needed to initialize the SU passive location and as shown in FIG. 4C, the reserved bits in the NDPA frame can be used to indicate that the measurement sequence following this NDPA is used for passive location.

For the security protection, the slave APs that are not in an active SU measurement sequence exchange with the master AP should act as a client and listen to the SU measurement sequence exchanges between the master AP and active slave AP, and the slave AP can derive its own location using the received information in the broadcast LMR. If the derived location doesn't match with the slave AP's own location, then there may exist some attacker during the NDP or the broadcast LMR, the slave AP should broadcast an alert information, for example, using the beacon (a new alert information field need to be defined) or the slave AP use the FTM request frame (a new alert information field need to be defined) to send an alert information to the master AP. When the master AP and other slave AP receive alert information, they should populate this alert information by including the alert information in its own beacon.

It should be noted that there could be any number of master AP and slave APs and the SU measurement sequence exchange for passive location could also happen between any pair of slave APs. This will make the SU measurement sequence exchange more distributed, such that this passive location system is more robust to the attack.

A second example for a passive location with one master AP and two slave APs is described in FIG. 4D.

The master AP first exchange SU measurement sequence with slave APs and after the master AP collects all the AS2AP LMR from multiple slave AP, the master AP can send an AP2AS LMR, and this is a broadcast packet, which includes the information below:

(1) the ToA/ToD information of the NDP from master AP and slave AP for all the SU measurement sequence.

(2) the master AP's and slave APs' location information (3) the LTF sequence information used for the master AP's and slave APs NDP for all the measurement sequence.

In one embodiment, the passive client will listen to the SU measurement sequence packet exchange between the master AP and slave AP, and after receiving the broadcast LMR, the passive client will have enough information to derive its own location. For the security protection, all the slave AP that is not active in a measurement sequence with master AP will act as a passive client and listen to all the SU measurement sequence exchange and the broadcast LMR. Based on this information, the slave AP derives its location and compares this derived location with its real location. If there is a mismatch, the slave AP and master AP will broadcast alert information to the passive client as mentioned above.

For all the methods described above, the passive clients need the ToA/ToD information of both of the master AP and slave AP to derive its own location. Another way to design the passive location is the master AP can map all the slave AP's timestamps (ToA/ToD) included in UL LMR into the master AP's clock, and the master AP includes this unified clock (time stamp) information in the broadcast LMR. For this case, the passive client only needs to listen to the slave AP's NDP and do not need to listen to the master AP's NDP, and based on this unified clock information for the ToD of the slave APs' NDPs, and the client's ToA estimation of the slave APs' NDPs, the passive client can derive its own location.

It is understood that the above descriptions are for purposes of illustration and are not meant to be limiting.

Figure 5:
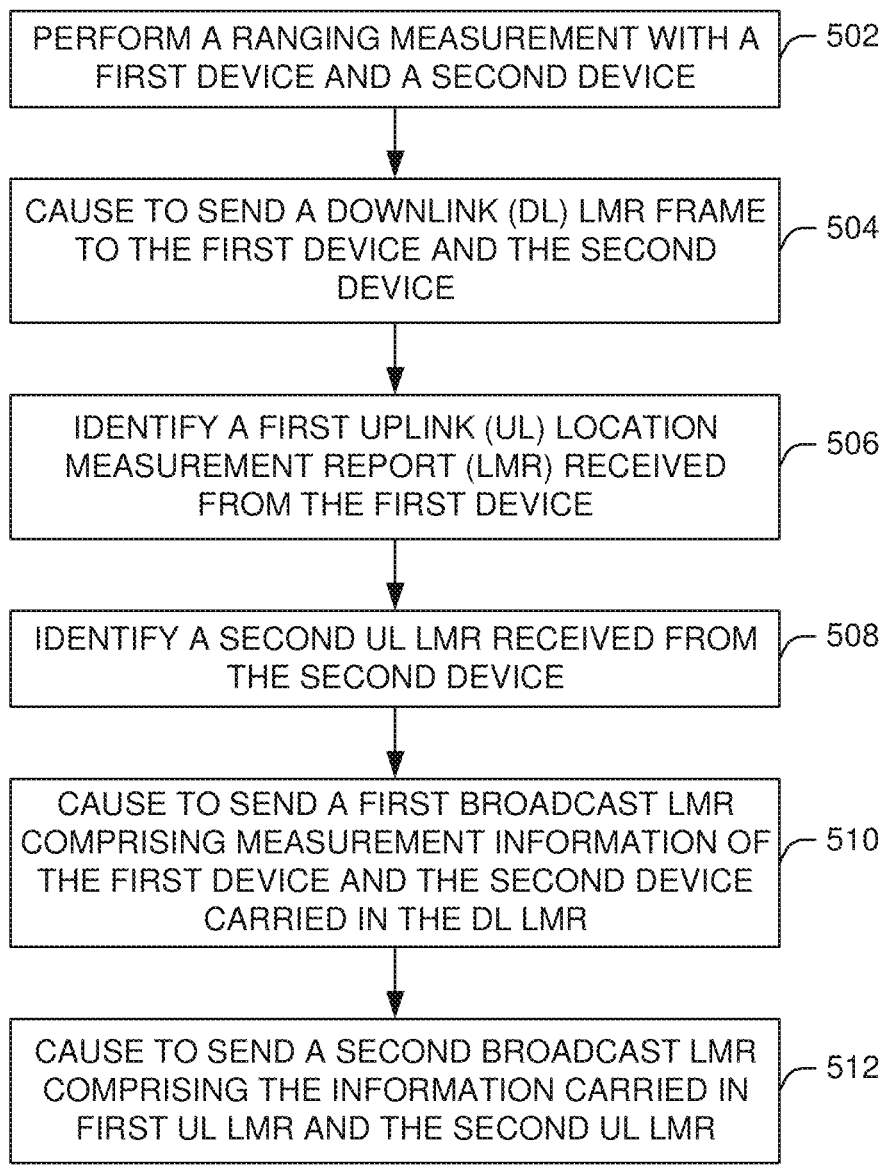
FIG. 5 illustrates a flow diagram of an illustrative process for an illustrative MU-measurement sequence based passive location system, in accordance with one or more example embodiments of the present disclosure.

FIG. 5 illustrates a flow diagram of an illustrative process 500 for an illustrative MU-measurement sequence based passive location system, in accordance with one or more example embodiments of the present disclosure.

At block 502, a device (e.g., the user device(s) 120 and/or the AP 102 of FIG. 1) may perform a ranging measurement with a first device and a second device. Performing a ranging measurement may also include identifying a first UL NDP from the first device, may also include identifying a second UL NDP from the second device, and may also include causing to send a DL NDP to the first device and the second device;

At block 504, the device may cause to send a downlink (DL) LMR frame to the first device and the second device.

The DL LMR frame may be carried in a high-efficiency (HE) multi-user (MU) physical layer (PHY) protocol data unit (PPDU).

At block 506, the device may identify a first uplink (UL) location measurement report (LMR) received from the first device.

At block 508, the device may identify a second UL LMR received from the second device. The first UL LMR and the second UL LMR may comprise at least one of a time of arrival (ToA), a time of departure (ToD), location information associated with the first device and the second device, or a sounding dialog token. Also, the DL LMR and the first UL LMR and the second UL LMR and the first broadcast LMR and the second broadcast LMR may be encrypted using an encryption key, wherein the encryption key may be determined during an association phase with the first device, the second device, and a passive device.

At block 510, the device may cause to send a first broadcast LMR comprising measurement information of the first device and the second device carried in the DL LMR. The first broadcast LMR may include first information to assist a passive client device to determine its location, and the second broadcast LMR comprises second information to assist a passive client device to determine its location. The first broadcast LMR comprises at least one of a long training field (LTF) sequence generation information, a sequence authentication code (SAC), a time of arrival (ToA), a time of departure (ToD), location information associated with the device and the first device and the second device or a sounding dialog token.

At block 512, the device may cause to send a second broadcast LMR comprising the information carried in first UL LMR and the second UL LMR.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 602 may include communications circuitry 602 and a transceiver 610 for transmitting and receiving signals to and from other communication, stations using one or more antennas 601. The transceiver 610 may be a device comprising both a transmitter and a receiver that are combined and share common circuitry (e.g., communication circuitry 602). The communication circuitry 602 may include amplifiers, filters, mixers, analog to digital and/or digital to analog converters. The transceiver 610 may transmit and receive analog or digital signals. The transceiver 610 may allow the reception of signals during transmission periods. This mode is known as full-duplex and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the figures.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by the first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a passive location measurement device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 702 for generation and processing of the baseband signals and for controlling operations of the main memory 704, the storage device 716, and/or the passive location measurement device 719. The baseband processor may be provided on a single radio card, a single chip, or an integrated circuit (IC).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The passive location measurement device 719 may carry out or perform any of the operations and processes (e.g., process 500) described and shown above. For example, the passive location measurement device 719 may be configured to address the security issue in the MU measurement sequence for passive location and may facilitate a low complexity method for passive location based on MU measurement sequence in 802.11az.

The passive location measurement device 719 be a variant of the trigger based (TB) ranging mode that consists of ranging exchanges between a responding STA (RSTA) and a set of initiating station devices (ISTAs). An RSTA may be a master AP and an ISTA may be a slave AP (referred to an anchor station).

The passive location measurement device 719 may send one more broadcast messages that may be received by passive client devices in proximity of a master access point (AP) after the master AP performs a cycle of ranging message exchange with slave APs. The one or more broadcast messages may contain information that may assist a passive client device in determining its own location based on knowing the master AP's and slave AP's location and on receiving one or more messages associated with the ranging message exchange.

The passive location measurement device 719 based on non-trigger-based SU measurement sequence may address the security issue in the MU sequence for passive location. Further, the passive location based on the SU measurement sequence has lower implementation complexity.

It is understood that the above are only a subset of what the passive location measurement device 719 may be configured to perform and that other functions included throughout this disclosure may also be performed by the passive location measurement device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
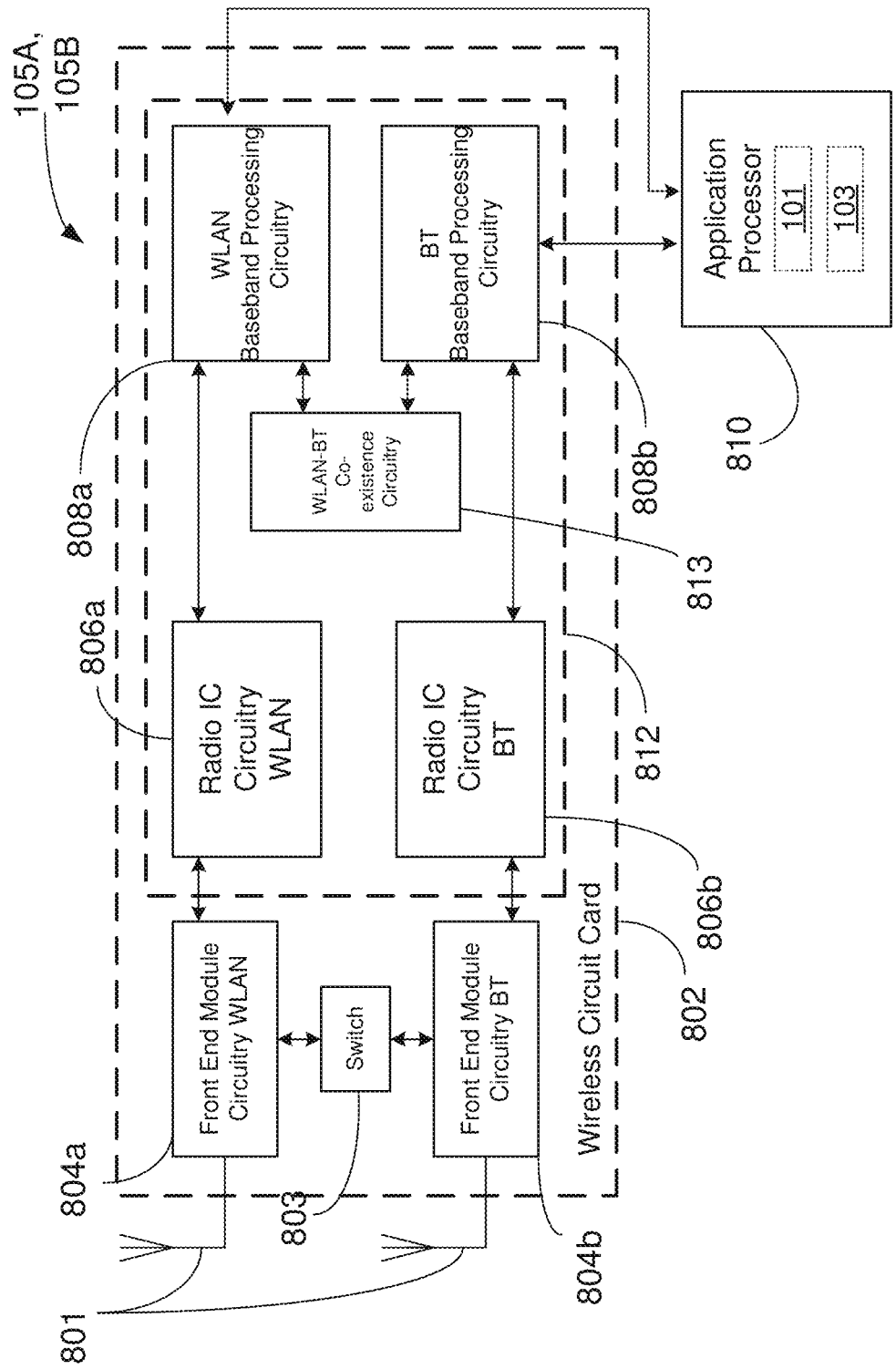
FIG. 8 is a block diagram of a radio architecture in accordance with some examples.

FIG. 8 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 804*a-b*, radio IC circuitry 806*a-b* and baseband processing circuitry 808*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804*a-b* may include a WLAN or Wi-Fi FEM circuitry 804*a* and a Bluetooth (BT) FEM circuitry 804*b*. The WLAN FEM circuitry 804*a* may include a receive signal path comprising circuitry configured to operate on WLAN RF signals received from one or more antennas 801, to amplify the received signals and to provide the amplified versions of the received signals to the WLAN radio IC circuitry 806*a* for further processing. The BT FEM circuitry 804*b* may include a receive signal path which may include circuitry configured to operate on BT RF signals received from one or more antennas 801, to amplify the received signals and to provide the amplified versions of the received signals to the BT radio IC circuitry 806*b* for further processing. FEM circuitry 804*a* may also include a transmit signal path which may include circuitry configured to amplify WLAN signals provided by the radio IC circuitry 806*a* for wireless transmission by one or more of the antennas 801. In addition, FEM circuitry 804*b* may also include a transmit signal path which may include circuitry configured to amplify BT signals provided by the radio IC circuitry 806*b* for wireless transmission by the one or more antennas. In the embodiment of FIG. 8, although FEM 804*a* and FEM 804*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806*a-b* as shown may include WLAN radio IC circuitry 806*a* and BT radio IC circuitry 806*b*. The WLAN radio IC circuitry 806*a* may include a receive signal path which may include circuitry to down-convert WLAN RF signals received from the FEM circuitry 804*a* and provide baseband signals to WLAN baseband processing circuitry 808*a*. BT radio IC circuitry 806*b* may in turn include a receive signal path which may include circuitry to down-convert BT RF signals received from the FEM circuitry 804*b* and provide baseband signals to BT baseband processing circuitry 808*b*. WLAN radio IC circuitry 806*a* may also include a transmit signal path which may include circuitry to up-convert WLAN baseband signals provided by the WLAN baseband processing circuitry 808*a* and provide WLAN RF output signals to the FEM circuitry 804*a* for subsequent wireless transmission by the one or more antennas 801. BT radio IC circuitry 806*b* may also include a transmit signal path which may include circuitry to up-convert BT baseband signals provided by the BT baseband processing circuitry 808*b* and provide BT RF output signals to the FEM circuitry 804*b* for subsequent wireless transmission by the one or more antennas 801. In the embodiment of FIG. 8, although radio IC circuitries 806*a* and 806*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 808*a-b* may include a WLAN baseband processing circuitry 808*a* and a BT baseband processing circuitry 808*b*. The WLAN baseband processing circuitry 808*a* may include a memory, such as, for example, a set of RAM arrays in a Fast Fourier Transform or Inverse Fast Fourier Transform block (not shown) of the WLAN baseband processing circuitry 808*a*. Each of the WLAN baseband circuitry 808*a* and the BT baseband circuitry 808*b* may further include one or more processors and control logic to process the signals received from the corresponding WLAN or BT receive signal path of the radio IC circuitry 806*a-b*, and to also generate corresponding WLAN or BT baseband signals for the transmit signal path of the radio IC circuitry 806*a-b*. Each of the baseband processing circuitries 808*a* and 808*b* may further include physical layer (PHY) and medium access control layer (MAC) circuitry, and may further interface with a device for generation and processing of the baseband signals and for controlling operations of the radio IC circuitry 806*a-b*.

Referring still to FIG. 8, according to the shown embodiment, WLAN-BT coexistence circuitry 813 may include logic providing an interface between the WLAN baseband circuitry 808*a* and the BT baseband circuitry 808*b* to enable use cases requiring WLAN and BT coexistence. In addition, a switch 803 may be provided between the WLAN FEM circuitry 804*a* and the BT FEM circuitry 804*b* to allow switching between the WLAN and BT radios according to application needs. In addition, although the antennas 801 are depicted as being respectively connected to the WLAN FEM circuitry 804*a* and the BT FEM circuitry 804*b*, embodiments include within their scope the sharing of one or more antennas as between the WLAN and BT FEMs, or the provision of more than one antenna connected to each of FEM 804*a* or 804*b*.

In some embodiments, the front-end module circuitry 804*a-b*, the radio IC circuitry 806*a-b*, and baseband processing circuitry 808*a-b* may be provided on a single radio card, such as wireless radio card 802. In some other embodiments, the one or more antennas 801, the FEM circuitry 804a-b and the radio IC circuitry 806a-b may be provided on a single radio card. In some other embodiments, the radio IC circuitry 806a-b and the baseband processing circuitry 808a-b may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 808b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 9:
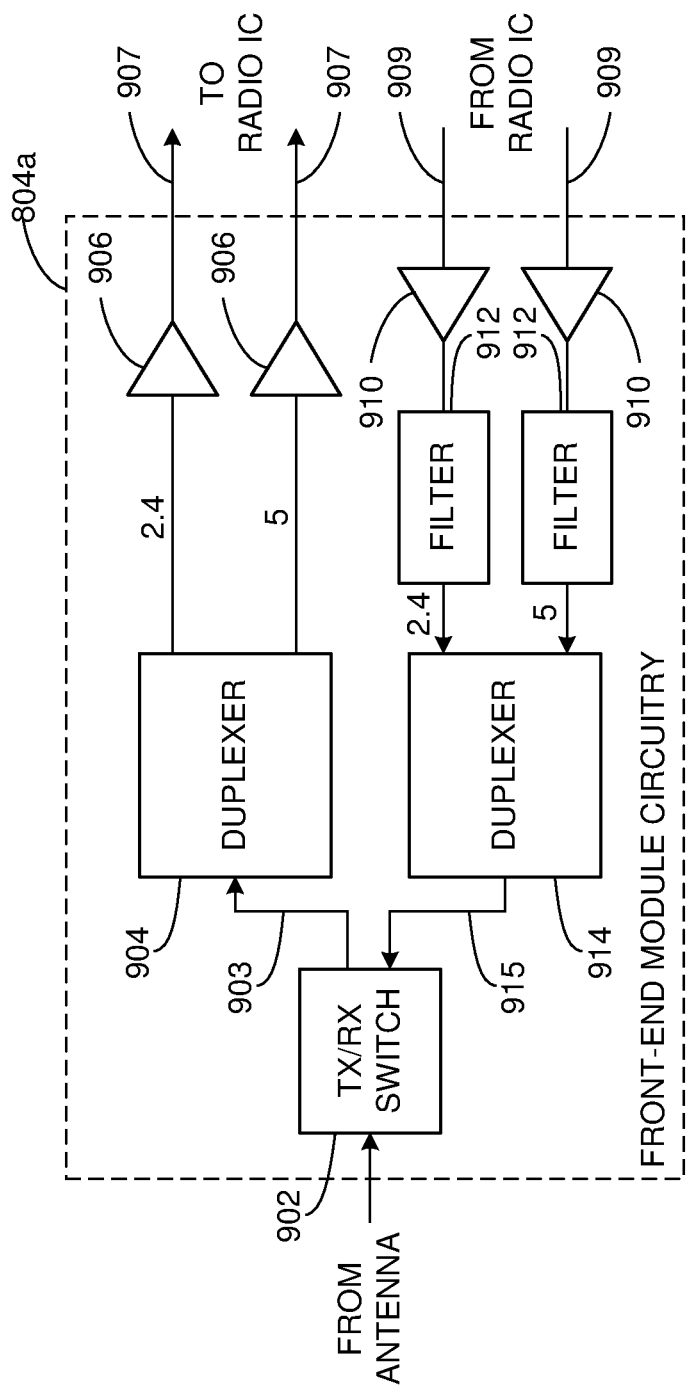
FIG. 9 illustrates an example front-end module circuitry for use in the radio architecture of FIG. 8 in accordance with some examples.

FIG. 9 illustrates WLAN FEM circuitry 804a in accordance with some embodiments. Although the example of FIG. 9 is described in conjunction with the WLAN FEM circuitry 804a, the example of FIG. 9 may be described in conjunction with the example BT FEM circuitry 804b (FIG. 8), although other circuitry configurations may also be suitable.

In some embodiments, the FEM circuitry 804a may include a TX/RX switch 902 to switch between transmit mode and receive mode operation. The FEM circuitry 804a may include a receive signal path and a transmit signal path. The receive signal path of the FEM circuitry 804a may include a low-noise amplifier (LNA) 906 to amplify received RF signals 903 and provide the amplified received RF signals 907 as an output (e.g., to the radio IC circuitry 806a-b (FIG. 8)). The transmit signal path of the circuitry 804a may include a power amplifier (PA) to amplify input RF signals 909 (e.g., provided by the radio IC circuitry 806a-b), and one or more filters 912, such as band-pass filters (BPFs), low-pass filters (LPFs) or other types of filters, to generate RF signals 915 for subsequent transmission (e.g., by one or more of the antennas 801 (FIG. 8)) via an example duplexer 914.

In some dual-mode embodiments for Wi-Fi communication, the FEM circuitry 804a may be configured to operate in either the 2.4 GHz frequency spectrum or the 5 GHz frequency spectrum. In these embodiments, the receive signal path of the FEM circuitry 804a may include a receive signal path duplexer 904 to separate the signals from each spectrum as well as provide a separate LNA 906 for each spectrum as shown. In these embodiments, the transmit signal path of the FEM circuitry 804a may also include a power amplifier 910 and a filter 912, such as a BPF, an LPF or another type of filter for each frequency spectrum and a transmit signal path duplexer 904 to provide the signals of one of the different spectrums onto a single transmit path for subsequent transmission by the one or more of the antennas 801 (FIG. 8). In some embodiments, BT communications may utilize the 2.4 GHz signal paths and may utilize the same FEM circuitry 804a as the one used for WLAN communications.

Figure 10:
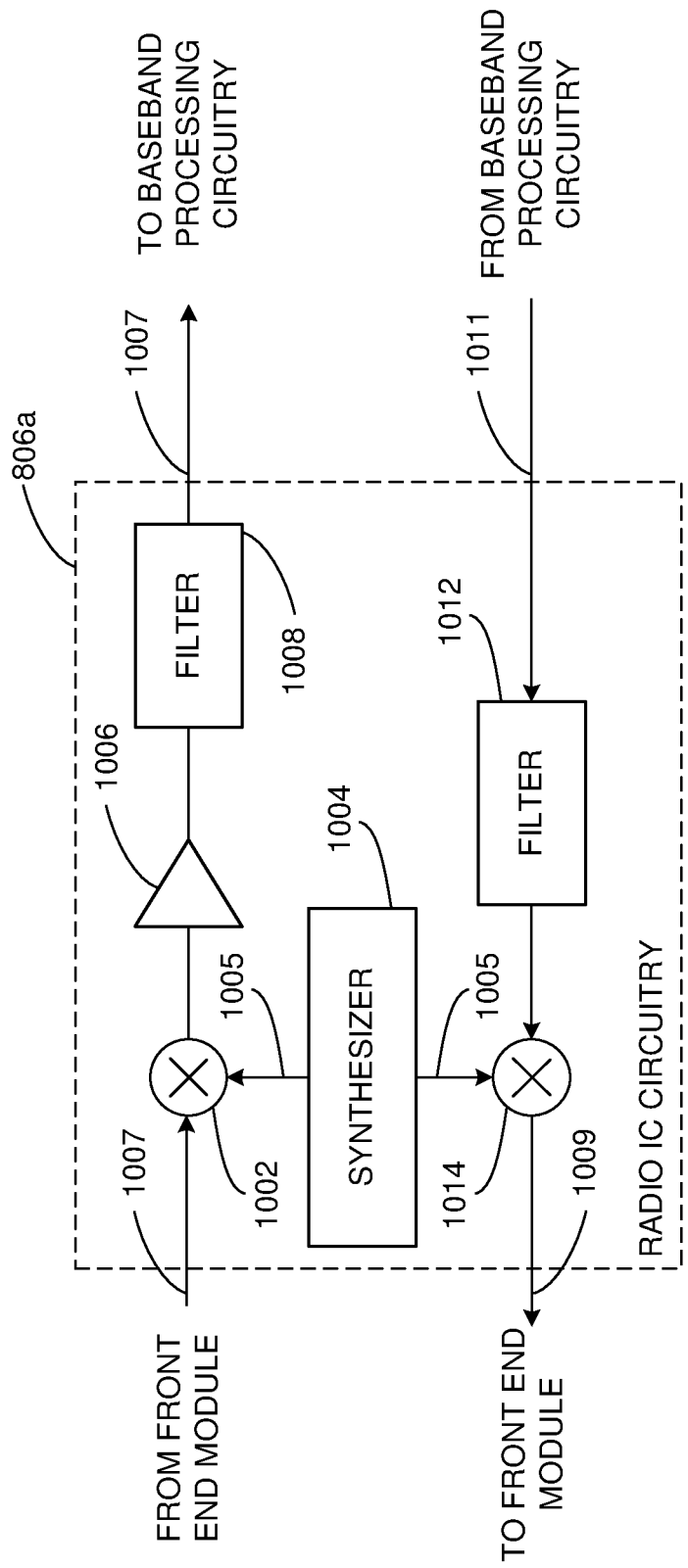
FIG. 10 illustrates an example radio IC circuitry for use in the radio architecture of FIG. 8 in accordance with some examples.

FIG. 10 illustrates radio IC circuitry 806a in accordance with some embodiments. The radio IC circuitry 806a is one example of circuitry that may be suitable for use as the WLAN or BT radio IC circuitry 806a/806b (FIG. 8), although other circuitry configurations may also be suitable. Alternatively, the example of FIG. 10 may be described in conjunction with the example BT radio IC circuitry 806b.

In some embodiments, the radio IC circuitry 806a may include a receive signal path and a transmit signal path. The receive signal path of the radio IC circuitry 806a may include at least mixer circuitry 1002, such as, for example, down-conversion mixer circuitry, amplifier circuitry 1006 and filter circuitry 1008. The transmit signal path of the radio IC circuitry 806a may include at least filter circuitry 1012 and mixer circuitry 1014, such as, for example, up-conversion mixer circuitry. Radio IC circuitry 806a may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804a-b (FIG. 8) based on the synthesized frequency 1005 provided by synthesizer circuitry 1004. The amplifier circuitry 1006 may be configured to amplify the down-converted signals and the filter circuitry 1008 may include an LPF configured to remove unwanted signals from the down-converted signals to generate output baseband signals 1007. Output baseband signals 1007 may be provided to the baseband processing circuitry 808a-b (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804a-b. The baseband signals 1011 may be provided by the baseband processing circuitry 808a-b and may be filtered by filter circuitry 1012. The filter circuitry 1012 may include an LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 10 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 907 (FIG. 9) may comprise a balanced signal, although the scope of the embodiments is not limited in this respect. The I and Q baseband output signals may be provided to low-noise amplifier, such as amplifier circuitry 1006 (FIG. 10) or to filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1004 may be provided by a voltage controlled oscillator (VCO), although that is not a requirement. A divider control input may further be provided by either the baseband processing circuitry 808a-b (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the example application processor 810. The application processor 810 may include, or otherwise be connected to, one of the example secure signal converter 101 or the example received signal converter 103 (e.g., depending on which device the example radio architecture is implemented in).

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency (fLO).

Figure 11:
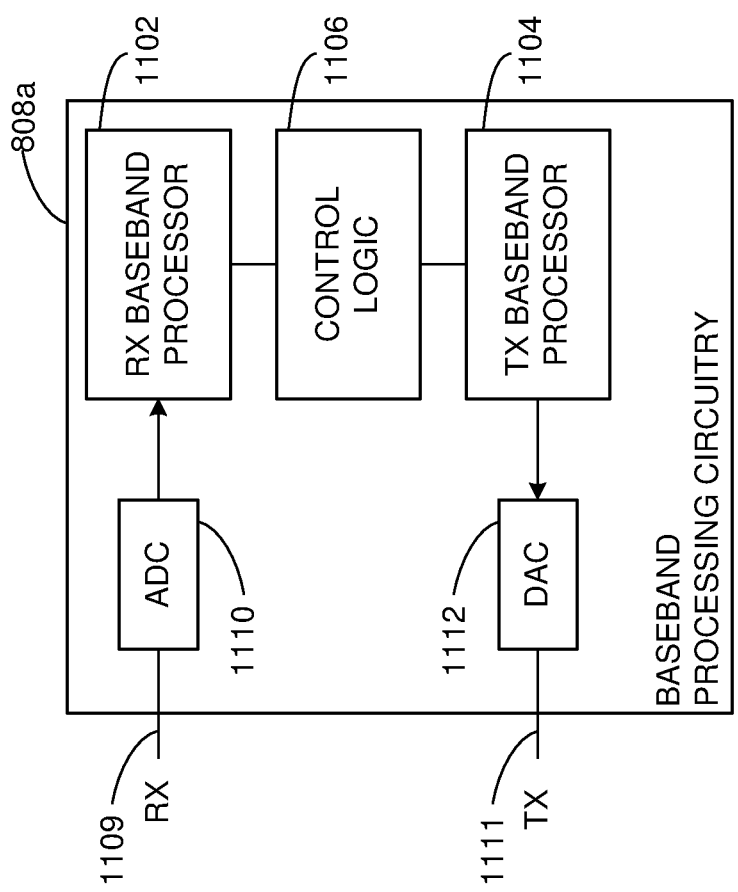
FIG. 11 illustrates an example baseband processing circuitry for use in the radio architecture of FIG. 8 in accordance with some examples.

FIG. 11 illustrates a functional block diagram of baseband processing circuitry 808a in accordance with some embodiments. The baseband processing circuitry 808a is one example of circuitry that may be suitable for use as the baseband processing circuitry 808a (FIG. 8), although other circuitry configurations may also be suitable. Alternatively, the example of FIG. 10 may be used to implement the example BT baseband processing circuitry 808b of FIG. 8.

The baseband processing circuitry 808a may include a receive baseband processor (RX BBP) 1102 for processing receive baseband signals 1109 provided by the radio IC circuitry 806a-b (FIG. 8) and a transmit baseband processor (TX BBP) 1104 for generating transmit baseband signals 1111 for the radio IC circuitry 806a-b. The baseband processing circuitry 808a may also include control logic 1106 for coordinating the operations of the baseband processing circuitry 808a.

In some embodiments (e.g., when analog baseband signals are exchanged between the baseband processing circuitry 808a-b and the radio IC circuitry 806a-b), the baseband processing circuitry 808a may include ADC 1110 to convert analog baseband signals 1109 received from the radio IC circuitry 806a-b to digital baseband signals for processing by the RX BBP 1102. In these embodiments, the baseband processing circuitry 808a may also include DAC 1112 to convert digital baseband signals from the TX BBP 1104 to analog baseband signals 1111.

In some embodiments that communicate OFDM signals or OFDMA signals, such as through baseband processor 808a, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising memory and processing circuitry configured to: determine an encryption key used for authentication with one or more first devices; identify a location measurement report (LMR) frame received from a slave access point (AP); and broadcast a downlink LMR and an uplink LMR, wherein the downlink LMR and the uplink LMR include information associated with the identified LMR.

Example 2 may include the device of example 1 and/or some other example herein, wherein a time interval between the downlink LMR and the uplink LMR may be short inter-frame space (SIFS).

Example 3 may include the device of example 1 and/or some other example herein, wherein the uplink LMR comprises at least one of a long training field (LTF) sequence generation information, a sequence authentication code (SAC), a time of arrival (ToA), a time of departure (ToD), location information associated with the device and the slave AP, or a sounding dialog token.

Example 4 may include the device of example 1 and/or some other example herein, wherein the encryption key may be determined during an association phase with the device.

Example 5 may include the device of example 1 and/or some other example herein, wherein the downlink LMR comprises at least one of a long training field (LTF) sequence generation information, a sequence authentication code (SAC), a time of arrival (ToA), a time of departure (ToD), location information associated with the device and the slave AP or a sounding dialog token.

Example 6 may include the device of example 5 and/or some other example herein, wherein the sounding dialog token may be to identify the LMR frame.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver.

Example 9 may include a non-transitory computer-readable medium storing computer-executable instructions which when executed by one or more processors result in performing operations comprising: determining an encryption key used for authentication with one or more first devices; identifying a location measurement report (LMR) frame received from a slave access point (AP); and broadcasting a downlink LMR and an uplink LMR, wherein the downlink LMR and the uplink LMR include information associated with the identified LMR.

Example 10 may include the non-transitory computer-readable medium of example 9 and/or some other example herein, wherein a time interval between the downlink LMR and the uplink LMR may be short inter-frame space (SIFS).

Example 11 may include the non-transitory computer-readable medium of example 9 and/or some other example herein, wherein the uplink LMR comprises at least one of a long training field (LTF) sequence generation information, a sequence authentication code (SAC), a time of arrival (ToA), a time of departure (ToD), location information associated with the device and the slave AP, or a sounding dialog token.

Example 12 may include the non-transitory computer-readable medium of example 9 and/or some other example herein, wherein the encryption key may be determined during an association phase with the device.

Example 13 may include the non-transitory computer-readable medium of example 9 and/or some other example herein, wherein the downlink LMR comprises at least one of a long training field (LTF) sequence generation information, a sequence authentication code (SAC), a time of arrival (ToA), a time of departure (ToD), location information associated with the device and the slave AP or a sounding dialog token.

Example 14 may include the non-transitory computer-readable medium of example 13 and/or some other example herein, wherein the sounding dialog token may be to identify the LMR frame.

Example 15 may include a method comprising: determining an encryption key used for authentication with one or more first devices; identifying a location measurement report (LMR) frame received from a slave access point (AP); and broadcasting a downlink LMR and an uplink LMR, wherein the downlink LMR and the uplink LMR include information associated with the identified LMR.

Example 16 may include the method of example 15 and/or some other example herein, wherein a time interval between the broadcast downlink LMR and the broadcast uplink LMR may be short inter-frame space (SIFS).

Example 17 may include the method of example 15 and/or some other example herein, wherein the uplink LMR comprises at least one of a long training field (LTF) sequence generation information, a sequence authentication code (SAC), a time of arrival (ToA), a time of departure (ToD), location information associated with the device and the slave AP, or a sounding dialog token.

Example 18 may include the method of example 15 and/or some other example herein, wherein the encryption key may be determined during an association phase with the device.

Example 19 may include the method of example 15 and/or some other example herein, wherein the downlink LMR comprises at least one of a long training field (LTF) sequence generation information, a sequence authentication code (SAC), a time of arrival (ToA), a time of departure (ToD), location information associated with the device and the slave AP, or a sounding dialog token.

Example 20 may include the method of example 19 and/or some other example herein, wherein the sounding dialog token may be to identify the LMR frame.

Example 21 may include an apparatus comprising means for: determine an encryption key used for authentication with one or more first devices; identify a location measurement report (LMR) frame received from a slave access point (AP); and broadcast a downlink LMR and an uplink LMR, wherein the downlink LMR and the uplink LMR include information associated with the identified LMR.

Example 22 may include the apparatus of example 21 and/or some other example herein, wherein a time interval between the broadcast downlink LMR and the broadcast uplink LMR may be short inter-frame space (SIFS).

Example 23 may include the apparatus of example 21 and/or some other example herein, wherein the uplink LMR comprises at least one of a long training field (LTF) sequence information, a sequence authentication code (SAC), a time of arrival (ToA), a time of departure (ToD), location information associated with the device and the slave AP, or a sounding dialog token.

Example 24 may include the apparatus of example 21 and/or some other example herein, wherein the encryption key may be determined during an association phase with the device.

Example 25 may include the apparatus of example 21 and/or some other example herein, wherein the downlink LMR comprises at least one of a sequence authentication code (SAC), a sequence authentication code (SAC), a time of arrival (ToA), a time of departure (ToD), or a sounding dialog token.

Example 26 may include the apparatus of example 25 and/or some other example herein, wherein the sounding dialog token may be to identify the LMR frame.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or another particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    initiate a passive trigger based (TB) ranging measurement with first device and a second device, wherein the passive TB ranging measurement comprises a passive TB ranging measurement phase followed by a passive TB ranging measurement reporting phase;
    encode a downlink (DL) location measurement report (LMR) frame for transmission;
    encode a trigger frame (TF) for transmission to the first device and second device; wherein the TF triggers the first device to send a first UL LMR the second device to send a second UL LMR;
    encode, during the passive TB ranging measurement reporting phase, a first broadcast LMR comprising measurement information of the first device and the second device carried in the DL LMR; and
    encode, during the passive TB ranging measurement reporting phase, a second broadcast LMR comprising the measurement information carried in first UL LMR and the second UL LMR.

2. The device of claim 1, wherein at least part of the passive TB ranging measurement is decoded by a passive station device (PSTA).

3. The device of claim 1, wherein the passive TB ranging measurement indicates to a passive station device (PSTA) to passively estimate its differential distance to other devices participating in the passive TB ranging measurement.

4. The device of claim 3, wherein the PSTA is not an active transmitting participant in the passive TB ranging measurement.

5. The device of claim 1, wherein the processing circuitry is further configured to encode the TF as a ranging TF of subtype passive TB measurement exchange.

6. The device of claim 1, wherein the TF triggers the first device to send a first UL LMR the second device to send a second UL LMR.

7. The device of claim 1, wherein the processing circuitry is further configured to decode a first UL NDP and a second UL NDP received from the first device and the second device respectively during the passive TB ranging measurement phase.

8. The device of claim 1, wherein the first UL LMR comprises a sounding dialog token identifying a measurement phase in which timestamps were measured.

9. The device of claim 1, further comprising a transceiver configured to transmit and receive wireless signals.

10. The device of claim 9, further comprising an antenna coupled to the transceiver.

11. A non-transitory computer-readable medium storing computer-executable instructions which when executed by one or more processors result in performing operations comprising:
    initiating a passive trigger based (TB) ranging measurement with first device and a second device, wherein the passive TB ranging measurement comprises a passive TB ranging measurement phase followed by a passive TB ranging measurement reporting phase;
    encoding a downlink (DL) location measurement report (LMR) frame for transmission;
    encoding a trigger frame (TF) for transmission to the first device and second device;
    wherein the TF triggers the first device to send a first UL LMR the second device to send a second UL LMR;
    encoding, during the passive TB ranging measurement reporting phase, a first broadcast LMR comprising measurement information of the first device and the second device carried in the DL LMR; and
    encoding, during the passive TB ranging measurement reporting phase, a second broadcast LMR comprising the measurement information carried in first UL LMR and the second UL LMR.

12. The non-transitory computer-readable medium of claim 11, wherein at least part of the passive TB ranging measurement is decoded by a passive station device (PSTA).

13. The non-transitory computer-readable medium of claim 11, wherein the passive TB ranging measurement indicates to a passive station device (PSTA) to passively estimate its differential distance to other devices participating in the passive TB ranging measurement.

14. The non-transitory computer-readable medium of claim 13, wherein the PSTA is not an active transmitting participant in the passive TB ranging measurement.

15. The non-transitory computer-readable medium of claim 11, wherein the operations further comprise encoding the TF as a ranging TF of subtype passive TB measurement exchange.

16. The non-transitory computer-readable medium of claim 11, wherein the TF triggers the first device to send a first UL LMR the second device to send a second UL LMR.

17. The non-transitory computer-readable medium of claim 11, wherein the operations further comprise decoding a first UL NDP and a second UL NDP received from the first device and the second device respectively during the passive TB ranging measurement phase.

18. The non-transitory computer-readable medium of claim 11, wherein the first UL LMR comprises a sounding dialog token identifying a measurement phase in which timestamps were measured.

19. A method comprising:
- initiating, by one or more processors, a passive trigger based (TB) ranging measurement with first device and a second device, wherein the passive TB ranging measurement comprises a passive TB ranging measurement phase followed by a passive TB ranging measurement reporting phase;
- encoding a downlink (DL) location measurement report (LMR) frame for transmission;
- encoding a trigger frame (TF) for transmission to the first device and second device; wherein the TF triggers the first device to send a first UL LMR the second device to send a second UL LMR;
- encoding, during the passive TB ranging measurement reporting phase, a first broadcast LMR comprising measurement information of the first device and the second device carried in the DL LMR; and
- encoding, during the passive TB ranging measurement reporting phase, a second broadcast LMR comprising the measurement information carried in first UL LMR and the second UL LMR.

20. The method of claim 19, wherein at least part of the passive TB ranging measurement is decoded by a passive station device (PSTA).

* * * * *